Patented Jan. 8, 1952

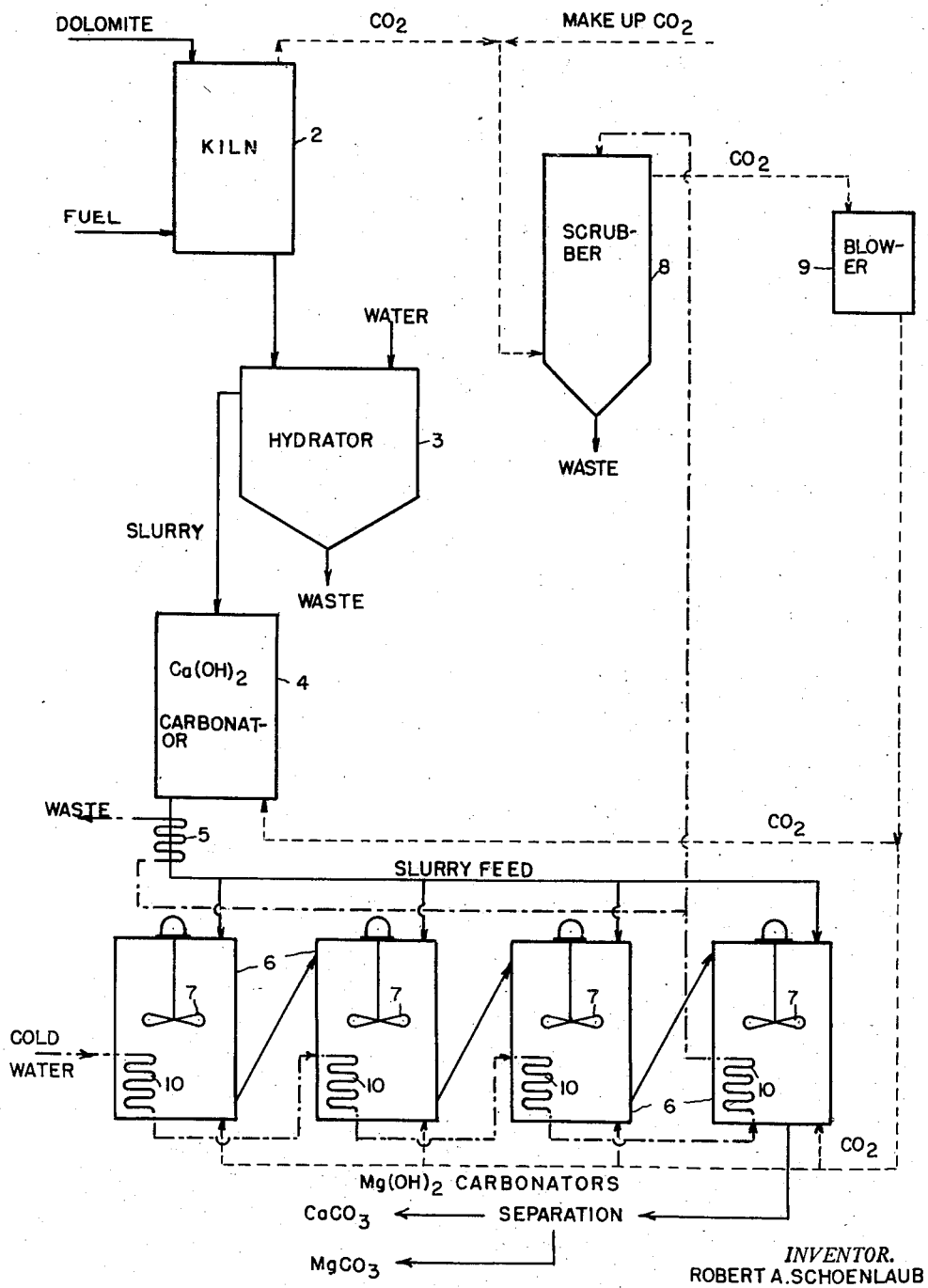

2,581,719

UNITED STATES PATENT OFFICE 2,581,719

OBTAINING MAGNESIA FROM MAGNESIA-CONTAINING ROCK

Robert A. Schoenlaub, Tiffin, Ohio, assignor to Basic Refractories, Inc., Cleveland, Ohio, a corporation of Ohio Application January 29, 1945, Serial No. 575,088

9 Claims. (Cl. 23—67)

In my patent applications Ser. Nos. 476,496 and 486,215, which have issued as Patents 2,414,980 and 2,433,297, respectively, I have set forth the production and separation of magnesium and calcium carbonate crystals. One may use batch carbonation of a dolomite slurry or continuous carbonation in a single magnesium carbonator or continuous carbonization in a series of carbonators in which the degree of carbonation in each is controlled by the rate of supply of carbon dioxide. Batch carbonation however, is rather expensive and variable in product, and continuous carbonation in a single magnesia carbonator yields mixtures of small, medium and large crystals, which are not particularly easy to separate. And continuous carbonation in a series of carbonators is better, but retention of the crystals in a partially hydrated state renders them less effective for froth flotation. The present invention eliminates such difficulties and makes possible the cheap preparation of lansfordite and calcium carbonate from dolomite so that they can be easily separated. Other objects and advantages will appear from the following description.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:

The sole figure is a diagrammatic view of an apparatus arrangement in conformance with the invention.

The raw material may be dolomite or other magnesia-providing carbonate or oxide or hydroxide rock, each as relatively pure dolomite, magnesium lime stone, predazzite, pencatite, brucite, magnesite, etc., also the reaction product of magnesium silicate and CaO, and for conciseness all such are hereinafter referred to as "dolomite."

The dolomite rock may be burned in a furnace or kiln, as kiln 2 in the drawing, at any convenient temperature, subject to two general limitations. First, the stone must be more or less completely calcined, and second, it must not be burned so hard that it will not react with water and $CO_2$. This is equivalent to a range of firing temperature of from about 1700° F. to 2600° F. Normally, a low temperature calcination to an ignition loss of about 1 per cent is preferred. Satisfactory calcine may be produced in multiple hearth roasters, rotary kilns, stack kilns, etc., provided the stone is suitable and adapted to the furnace and a proper burning schedule is followed.

Any convenient feeder and hydrator 3 may be used which will form a uniform slurry. In some instances pulverization may be necessary but usually hydration will produce the desired comminution. If so, it is helpful to classify out any contained coarse matter, hard core and the like. The slurry should not be so thick that it is difficult to handle, nor so thin that an unnecessarily large volume has to be processed. Normally, 8 per cent of calcine in 92 per cent water slurry is about a maximum density, and 6 to 7 per cent of calcine an optimum.

From the hydrator 3 the slurry is transferred to the calcium hydroxide carbonator 4. This carbonator may be of any design or type provided it gives intimate contact between gas and slurry and sufficient agitation and has a means of introducing fresh and removing spent flue gas. Gas and slurry are reacted in this carbonator until the pH is reduced to about 10.5. This insures substantially complete carbonation of the $Ca(OH)_2$. A pH controller can actuate a motorized valve on the gas supply to hold the slurry closely on this control point. The slurry temperatures in this operation should be 75° F. or higher. Normally, due to the heat of reaction and absence of cooling, it will be about 130° F. The carbonator should be large enough that it will give an average retention time of about one and one-half hours.

From the calcium hydroxide carbonator the partially carbonated slurry passes through a heat exchanger 5 and then to a series of magnetic carbonators 6. The slurry in these carbonators should be maintained at substantially complete carbonation, pH about 8.5. In the first of these carbonators magnesium carbonate crystals are formed. Then, as the magnesium carbonate crystals pass on through the series of carbonators receiving carbon dioxide, they are continuously grown with effective control of their development rate by the introduction of additional magnesia-containing slurry in which the original calcium hydroxide has been converted to calcium carbonate by partial carbonation. In the present invention magnesium carbonate crystal growth thus proceeds with carbonating the partially carbonated slurry and feeding the additional slurry at such rates as to controllably and selectively develop the magnesium carbonate crystals to relatively large size, and the control is exercised by controlled additional slurry feed rather than by control of the CO₂ feed. Its advantages will become apparent.

The carbonators may be of any type, which provides for the introduction of new and the release of spent gas, and intimate contact between gas and slurry and furnishes suitable agitators 7, and cooling coils. There should be enough carbonators to provide the necessary uniformity of retention time and they should be large enough to provide a sufficient average retention time. Generally, four carbonators giving a ratio of 5:1 between total volume and feed are satisfactory if the subsequent separation is done by froth flotation, but a greater number and a larger ratio of volume to feed may be necessary for general mechanical separation. The action of these carbonators will be discussed in more detail.

The gas system includes the kiln or furnace from which the gas is derived, a scrubbing tower 8 and blower 9 and pipes and manifolds. An excess of gas over that required in the process is normally provided by the combustion of the fuel and calcination of the stone. If desired, part of this excess may be wasted or disposed of elsewhere. If absorptuion is inefficient and a deficiency of gas is encountered, this too can be remedied by passing the gas successively through two or more carbonators so that a greater percentage of the CO₂ is utilized. Any cool scrubbed flue gas containing from 10 to 40 per cent CO₂ may be used for carbonation, the lower limit being fixed by the additional cost of handling larger volumes of gas, and the upper limit by the increasing difficulty of controlling the pH in the magnesia carbonators.

Control over this carbonization is necessary. The concentration of the gas has an important bearing on the pH of the slurry and the amount of magnesia dissolved as magnesium bicarbonate which is not susceptible to removal by the usual means. A high CO₂ gas will give excessive solution of magnesia. Carbonation with an average CO₂ content of about 10% will give satisfactory conditions. This concentration can be obtained by slowing the feed of higher CO₂ gas until the mean CO₂ content of the entering and outgoing gas is about 10 per cent. This control may be either automatic or manual. The magnesia inadvertently taken into solution may be recovered by recycling the effluent solution from separation back to the hydrator.

Cold water for cooling may be from ponds, spray towers, wells or by recirculation through a refrigerator system. Heat exchange between slurry and water may be accomplished by any conventional device having adequate transfer surface. Economy of water can be secured by using the partially heated water from the magnesia cells for gas scrubbing, cooling the lime slurry, or for any condensers that may be incidental to the process. Cooling is necessary to prevent the inversion of lansfordite, MgCO₃.5H₂O, to nesquehonite, MgCO₃.3H₂O. Nesquehonite is not as easy to separate and will contaminate the lime product. The inversion temperatures are variable with conditions, but in a plant should not be more than 60° F., and the temperature preferably should be less than 57° F.

The feature of the process is the formation of magnesium carbonate crystals which are large and uniform enough for separation. Small sizes or lack of uniformity makes separation difficult. Lansfordite can be made to grow at a rate of about 10 microns per hour. Magnesia introduced to provide the substance for growth requires an hour or two for reaction but normally this can be neglected and attention directed entirely to the growth of the lansfordite.

The first step of the magnesium carbonate crystallization is the carbonation of slurry in the first magnesia carbonator to form new crystals. Under conditions existing in this carbonator new crystals will automatically form as they are needed to absorb the constant addition of magnesia substance and the older crystals will grow at their maximum rate. The number of crystals fed to the remaining carbonators can be controlled by varying the rate of feed to this carbonator. An increase of feed rate will increase the number and a decrease will decrease the number, but the relation is not direct or simple.

The succeeding carbonators augment the size of the formed crystals as they pass through them. Slurry and gas are provided for this purpose. It is desirable for two reasons that the growth rate in these carbonators be substantially less than a maximum. First, maximum growth rates occur only during the formation of new crystals, and a margin of safety must be provided to prevent this. Second, crystals grown at their maximum rates have about twice the occluded impurity of crystals grown at less than their maximum growth rates. A growth rate at about 7 microns per hour is satisfactory.

The adjustment of feed to cause desirable growth rates is complicated by two antagonistic factors. First, in passing from the first to last agitator the number of crystals per unit volume available for absorbing the magnesia of the feed decreases by the continuous slurry addition. Second, the area of these crystals which absorbs the magnesia increases as the square of their dimension. The second factor outweighs the first and usually enough crystal area will be available but the conditions are so complex the feeds must be determined empirically for best results.

The number of carbonators in the series has an important bearing on the uniformity of the crystals produced. In a single carbonator there would be crystals of all sizes representing the various ages of crystals in such a carbonator. As the number of carbonators increases, the uniformity of crystal size improves since the newly formed crystals can no longer short circuit through the carbonating system to the same extent. Practically, a compromise is necessary, and four agitators are usually enough when the separation is to be made by froth flotation.

This system is quite reliable with ordinary consistent operation. The formation of new crystals and their growth to a more or less uniform size occurs automatically. Some adjustment of the slurry feed rates may occasionally be needed to improve or change the product. If, for example, so many crystals are formed in the first carbonator that they never grow to a desirable size in the later carbonators, the feed to and the flow from the first carbonator should be reduced. Conversely, if insufficient crystals are formed in the first carbonator so that spontaneous formation of new crystals occurs in the latter part of the process, the feed to the first carbonator should be increased. If, having adjusted the respective feeds, the crystals of the product are still too small, the feed to the first carbonator should be reduced and either the number or size of the later carbonators increased so that fewer crystals are formed and they are grown for longer periods. If the size of the crystals of the product is not sufficiently uniform, the number of carbonators should be increased.

The separation of the magnesium carbonate crystals may be carried out by any desired means, such as classification, flotation, etc. Flotation is particularly desirable, and a flotation apparatus of any known or preferred construction may be employed. Among effective collectors are organic acids or salts of organic acids which, in water solution, are anionic in character. Some of these are sodium palmitate, the collectors sold in the trade under the name "elastoil," naphthenic acid, sodium naphthenate, the commercial collector known as "tetranol," the commercial distillate from pine tar known as "pineol 345-A" sodium oleate, etc. For example, sodium naphthenate in amounts of 1.2 pounds per ton of solids may be employed. With such collectors, the magnesium carbonate crystals are collected in the froth, and the calcium carbonate goes in the tailings. The detail of flotation may be as in my application Serial No. 486,215.

Generally, it is preferred to operate the carbonation of the magnesium hydrate to the formation of lansfordite, $MgCO_3.5H_2O$; but where desired, the conditions may be operated to the production of nesquehonite, $MgCO_3.3H_2O$. The latter involves a higher temperature adjustment, as for instance 70° F. or more.

As an example: I calcined dolomite of the Niagara Formation from Northern Ohio of the following approximate composition:

| | Per cent |
|---|---|
| Ig. loss | 47.42 |
| $SiO_2$ | 0.23 |
| $Fe_2O_3$ | 0.086 |
| $Al_2O_3$ | 0.044 |
| CaO | 30.45 |
| MgO | 21.85 |

This was calcined in a size of about −10 mesh in a multiple hearth furnace, to an ignition loss of about 1%, and formed into a slurry in a ratio of about 7 parts of calcine to 93 parts of water. The slurry was then carbonated to a control point of pH 10.5 in a continuous carbonator of about 100 gallons capacity and at a temperature substantially above 100° F. I pumped 80 gallons per hour divided into 4 more or less equal parts to each of 4 identical carbonators. These carbonators have a capacity of 100 gallons and are so arranged that the crystals forming in one, progress through the others in the manner described. I continuously carbonated at a temperature of about 57° F. with scrubbed flue gas of about 15 per cent $CO_2$. I obtained a slurry product comprising mixtures of fine calcium carbonate, of about 1–2 microns in size and lansfordite crystals between about 50 and 70 microns in size with a few crystals smaller or larger than these limits.

These compounds when separated by flotation, classification, screening or otherwise have approximately the following composition expressed on a calcined basis:

| | Tailings | Concentrates |
|---|---|---|
| CaO | 96.0 | 7.8 |
| MgO | 2.5 | 92.0 |
| $SiO_2$, $R_2O_3$, etc | 1.5 | Trace |

Other modes of applying the principle of the invention may be employed, change being made as regards the details described, provided the features stated in any of the following claims, or the equivalent of such, be employed.

I therefore particularly point out and distinctly claim as my invention:

1. A process of the character described, which comprises supplying carbon dioxide to a slurry of calcined dolomite to a pH of about 10.5, at a temperature substantially above 100° F., thereby forming fine calcium carbonate crystals, then at a temperature not higher than about 57° F. supplying additional carbon dioxide to the partially carbonated slurry and adding fresh partially carbonated slurry in controlled amount from the first carbonation for reaction therewith at such rates as to selectively form lansfordite crystals of relatively large size, and separating the magnesium carbonate and the calcium carbonate without destroying the crystal form.

2. A process of the character described, which comprises supplying carbon dioxide to a slurry of calcined dolomite to a pH of about 10.5, thereby forming calcium carbonate crystals, then at a temperature below 60° F. supplying additional carbon dioxide to the partially carbonated slurry and adding fresh partially carbonated slurry in controlled amount from the first carbonation for reaction therewith at such rates as to selectively form lansfordite crystals of relatively large size, and separating the magnesium carbonate and the calcium carbonate.

3. A process of the character described, which comprises supplying carbon dioxide to a slurry of calcined dolomite to a pH of about 10.5, at a temperature substantially above 100° F., thereby forming calcium carbonate crystals, then at a temperature below 60° F. supplying additional carbon dioxide to the partially carbonated slurry and adding fresh partially carbonated slurry in controlled amount from the first carbonation for reaction therewith at such rates as to selectively form magnesium carbonate crystals, and separating the crystals.

4. A process of the character described, which comprises supplying carbon dioxide to a slurry of calcined dolomite to a pH of about 10.5, thereby forming calcium carbonate crystals, then at a lower temperature supplying additional carbon dioxide to the partially carbonated slurry and adding fresh slurry from the first carbonation for reaction therewith at such rates as to selectively form magnesium carbonate crystals of relatively large size, and separating the crystals.

5. A process of the character described, which comprises supplying carbon dioxide to a slurry of calcined dolomite thereby forming calcium carbonate crystals, then at a lower temperature supplying additional carbon dioxide to the partially carbonated slurry and feeding additional slurry from the first carbonation for reaction therewith at such rates as to selectively form lansfordite crystals of relatively large size, and separating the crystals.

6. A process of the character described, which comprises supplying carbon dioxide to a slurry of calcined dolomite thereby forming calcium carbonate crystals, and then subjecting the slurry to carbon dioxide and additions of fresh slurry from the first carbonation for reaction therewith at such rates as to selectively form lansfordite crystals.

7. A process of the character described, which comprises supplying carbon dioxide to a slurry of calcined dolomite thereby forming calcium carbonate, and then producing magnesium carbonate crystals in the slurry by supplying additional carbon dioxide and feeding fresh slurry from the first carbonation for reaction therewith at such rates as to selectively favor magnesium carbonate crystal growth.

8. A process of the character described, which comprises supplying carbon dioxide to a slurry of calcined dolomite thereby forming calcium carbonate, and then selectively producing lansfordite crystals in the slurry by additional carbon dioxide and feeding fresh slurry from the first carbonation.

9. A process of the character described, which comprises supplying carbon dioxide to a slurry of calcined dolomite thereby forming calcium carbonate, and then selectively producing magnesium carbonate in the slurry by additional carbon dioxide and feeding fresh slurry from the first carbonation.

ROBERT A. SCHOENLAUB.

REFERENCES CITED

The following references are of record in the file of this patent:

UNITED STATES PATENTS

| Number | Name | Date |
|---|---|---|
| 1,256,068 | Sommer | Feb. 12, 1918 |
| 2,301,457 | Sadtler et al. | Nov. 10, 1942 |
| 2,357,130 | Pike | Aug. 29, 1944 |
| 2,358,818 | Miller | Sept. 26, 1944 |
| 2,374,632 | Walker | Apr. 24, 1945 |
| 2,390,095 | Gloss | Dec. 4, 1945 |